United States Patent
Chang

[11] Patent Number: 5,952,583
[45] Date of Patent: Sep. 14, 1999

[54] METHOD OF MEASURING A RIVER HORIZONTAL AVERAGE FLOW VELOCITY

[75] Inventor: Hak Soo Chang, Sungnam, Rep. of Korea

[73] Assignee: Chang Min Tech Co., Ltd., Sungnam, Rep. of Korea

[21] Appl. No.: 09/154,748

[22] Filed: Sep. 17, 1998

[30] Foreign Application Priority Data

Jun. 10, 1998 [KR] Rep. of Korea .............. 21590

[51] Int. Cl.$^6$ ............................................. G01F 1/20
[52] U.S. Cl. ............................................. 73/861.18
[58] Field of Search ............................ 73/861.18, 861.27, 73/861.28, 861.29, 861.31

[56] References Cited

U.S. PATENT DOCUMENTS

| | | | |
|---|---|---|---|
| 3,546,935 | 12/1970 | Bruha | 73/861.31 |
| 3,564,912 | 2/1971 | Malone et al. | 73/861.31 |
| 4,094,193 | 6/1978 | Gerlach | 73/861.27 X |
| 5,515,721 | 5/1996 | Kim et al. | 73/861.31 X |
| 5,734,111 | 3/1998 | Soo | 73/861.27 X |
| 5,780,747 | 7/1998 | Soo | 73/861.29 X |
| 5,804,739 | 9/1998 | Hermann et al. | 73/861.27 X |

*Primary Examiner*—Elizabeth L. Dougherty
*Attorney, Agent, or Firm*—Foley & Lardner

[57] ABSTRACT

A method of measuring a horizontal average flow velocity at a plurality of depths using an ultrasonic beam to obtain the flowrate of a river comprises steps of emitting continuous ultrasonic beams along a selected flowrate measuring free crosssection from one skirt of a river and measuring a moving distance of paired ultrasonic receiving transducers spaced away in an interval from each other until the outputting voltages of the paired ultrasonic receiving transducers become equal to each other and then measuring a horizontal average flow velocity, in which the paired ultrasonic receiving transducers are electrically connected to differential amplifiers in order to measure the position at a moment that their outputting voltage differences becomes zero, and furthermore steps of testing and correcting an apparatus for performing the method.

5 Claims, 11 Drawing Sheets

Fig. 1
Prior Art
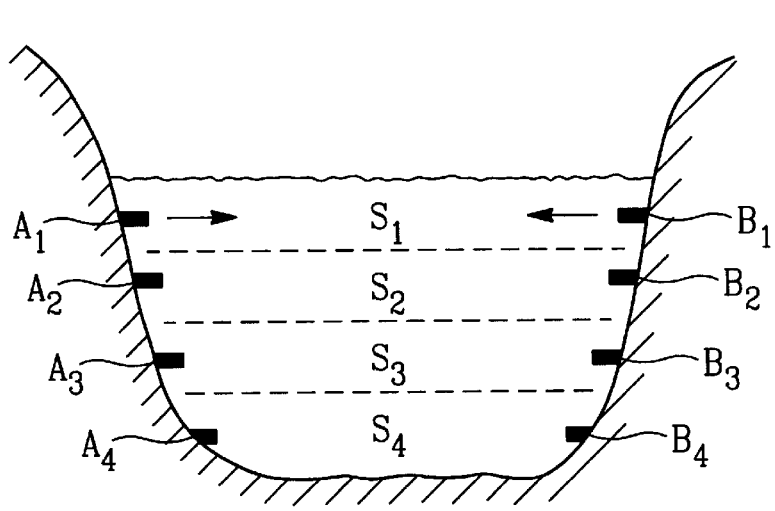
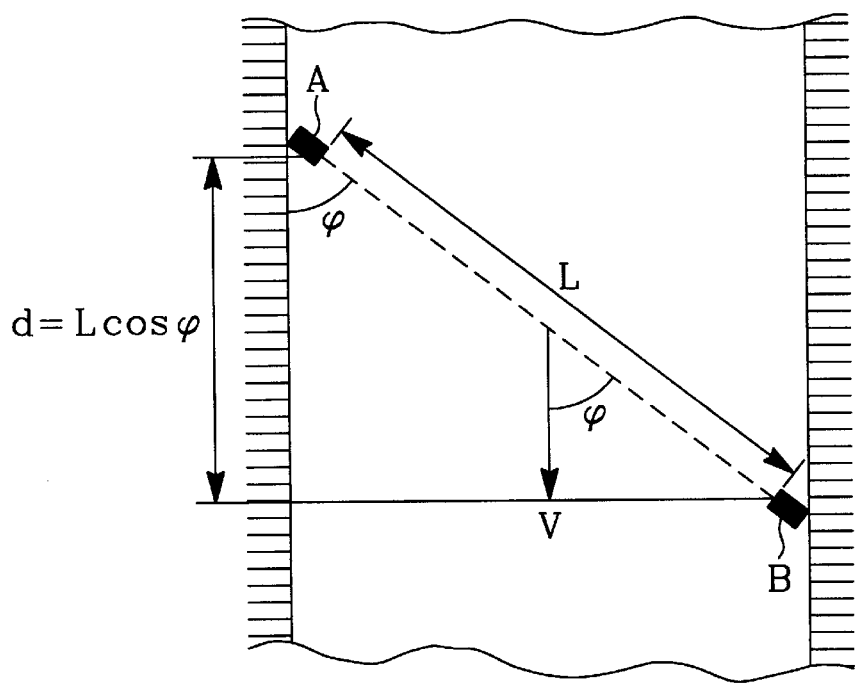

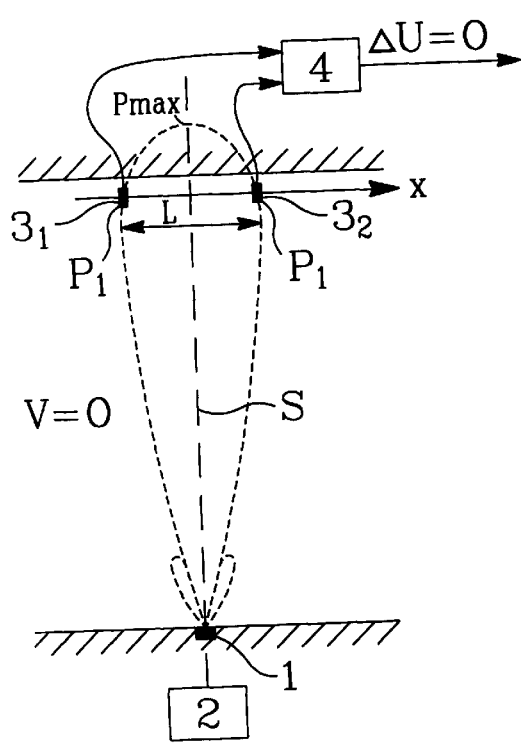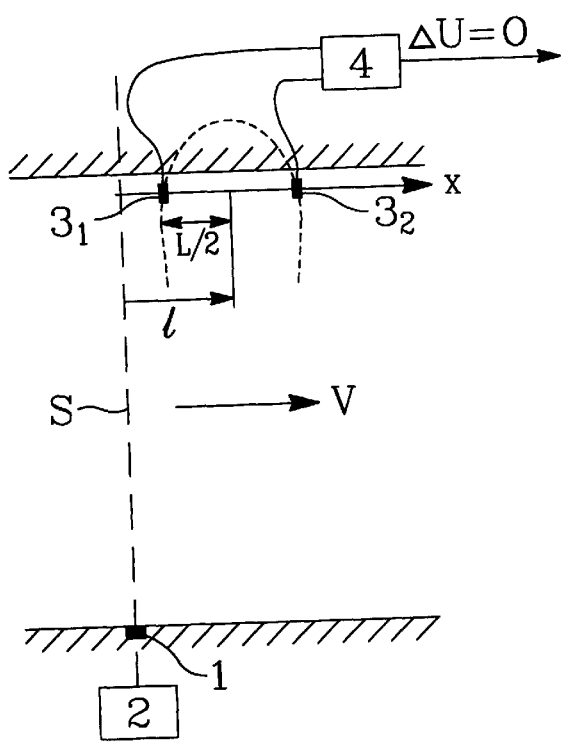

METHOD OF MEASURING A RIVER HORIZONTAL AVERAGE FLOW VELOCITY

BACKGROUND OF THE INVENTION

The invention is related to providing a flowrate measuring technology of a river using an ultrasonic wave, and particularly, to providing a method of measuring a horizontal average flow velocity at a plurality of depths using an ultrasonic beam to calculate a flowrate of a larger river or sluiceway open channel.

PRIOR ART

A conventional flow velocity measuring method of an open channel has used an ultrasonic wave to calculate a frowrate of the open channel as follows:

As shown in FIG. 1, a plurality of paired ultrasonic transducers $A_1$ and $B_1$, $A_2$ and $B_2$, $A_3$ and $B_3$ ... are mounted at a predetermined water depth along the skirt of at least one side of an open channel to form a certain angle $\phi$ relative to the direction of a flow velocity V. The ultrasonic transmitting times $T_{AB}$ and $T_{BA}$ transmitted from the transducer Ai to Bi and from Bi and Ai are measured as follows:

$$t_{AB} = \frac{L}{C + V\cos\varphi} \quad (a)$$

$$t_{BA} = \frac{L}{C - V\cos\varphi} \quad (b)$$

Wherein, C is an ultrasonic transmitting velocity (called "a sound velocity" below) in water, V is a horizontal average flow velocity and L is a distance between the transducers Ai and Bi.

The transmitting time differences $\Delta t(=t_{BA}-t_{AB})$ is calculated based on expressions (a) and (b) as follows:

$$\Delta t = t_{BA} - t_{AB} = \frac{2LV\cos\varphi}{C^2} \quad (C)$$

Wherein, the flow velocity V is as follows:

$$V = \frac{\Delta t C^2}{2L\cos\varphi} = \frac{\Delta t C^2}{2d} \quad (1)$$

The square of the sound velocity, $C^2$ is as follows:

$$C^2 = \frac{L^2}{t_{AB} t_{BA}}$$

Therefore, if above expression is substituted into the expression (1), the general flow velocity measurement expression is represented as follows:

$$V = \frac{L^2}{2d} \frac{t_{BA} - t_{AB}}{t_{AB} t_{BA}} \quad (2)$$

The ultrasonic flow velocity measurement method described above is called "An Ultrasonic Transmitting Time Difference Method", which is embodified from Model UF2100 CO manufactured by U.S.A. Ultraflux Co. The flowmeter of UF2100 CO uses a flow velocity measurement expression as follows:

$$V = \frac{L^2}{2d} \left( \frac{1}{t_{AB}} - \frac{1}{t_{BA}} \right)$$

As a result, it is equal to the expression (2).

$$\frac{L^2}{2d} \left( \frac{1}{t_{AB}} - \frac{1}{t_{BA}} \right) = \frac{L^2}{2d} \frac{t_{BA} - t_{AB}}{t_{AB} t_{BA}}$$

A well-known ultrasonic flowmeter for not only a pipe but also an open channel is subject to measure the flow velocity using the ultrasonic transmitting time difference method. Additional to the transmitting time difference method, there are frequency and phase difference methods to measure the frowrate, but, they are based on the ultrasonic transmitting time. A method of arranging ultrasonic transducers also is the same as that of FIG. 1.

And then, if a river is relatively wider, prior technologies of measuring a horizontal average velocity, cause some problems as follows:

First, when the frowrate of the river is calculated according to the measurement of a horizontal average flow velocity at a plurality of depths, an open area or a free crosssection S at a right angle to the direction of the water flowing is selected. Therefore, the flowrate Q is calculated as follows:

$$Q = V_s \cdot S \quad (3)$$

Wherein, Vs is a free crosssectional average flow velocity at a right angle to the free crosssectional area S. Thus, the flowrate may be calculated, measuring the crosssectional average flow velocity Vs at a plurality of water depths.

Another method is for calculating partial flowrate obtained by multiplying a partial area Si by a flow velocity Vi and next for summing up all partial flowrate. It is the same as a flowrate calculation method used in Model UF-2000 CO as follows:

$$Q = \sum_{i}^{n} (V_i S_i)$$

Even through any method is used, there are various crosssections in an interval distance d that the ultrasonic wave are propagated in various forms, in which the crosssections are not equal to one another as shown in FIG. 2. In other words, while the ultrasonic waves are transmitted or transmitted along line L under the influence of the flow velocity, the flow velocities at a plurality of points on the line L are different according to the shape of river channels at any corresponding point. The flow velocity measured by the ultrasonic wave is an average flow velocity, but the average flow velocity cannot be determined whether it is related to any crosssection. To it, the auxiliary crosssection be selected. It may cause the larger flowrate measurement error. For example, when the width of a river is 500 m and an angle $\phi$ is 45°, the distance d is equal to 500 m, but the natural river having the same free crosssection in the distance d does not almost exist. If the free crosssection is auxiliary selected, the flowrate measurement error cannot be evaluated in a higher reliability.

Second, flow velocities of skew angle and gyration (rotation) components are developed well.

As shown in FIG. 3, the flow velocity to be measured is a flow velocity $V\perp$ perpendicular to a crosssectional area S. If the direction of the flow velocity V is corresponded to that of the flow velocity V⊥ and has an angle φ with respect to the line L which an ultrasonic wave is transmitted, the result computed by the transmitting time difference flow velocity measurement expression (2) is the flow velocity V⊥. But, if the direction of the flow velocity has an angle φ+α to the line L, it causes the larger error on calculating the flow velocity by the expression (2). From FIG. 3, a related expression is deducted and a flow velocity is measured with the ultrasonic beam as follows:

$$V = \frac{L^2}{2L\cos(\varphi + \alpha)} \frac{t_{BA} - t_{AB}}{t_{AB}t_{BA}} \tag{d}$$

But, when the angle α of the skew flow is computed by the expression (2) under the unidentified condition, the result is represented as follows:

$$V' = \frac{L^2}{2L\cos\varphi} \frac{t_{BA} - t_{AB}}{t_{AB}t_{BA}} \tag{e}$$

The flow velocity for the calculation of the flowrate should be made as follows:

$$V_\perp = V\cos\alpha = \frac{L^2\cos\alpha}{2L\cos(\varphi + \alpha)} \frac{t_{BA} - t_{AB}}{t_{AB}t_{BA}} \tag{f}$$

Therefore, V' is considered as V⊥, and then the measurement error δv of V⊥ is represented as follows:

$$\delta_V = \frac{V' - V_\perp}{V_\perp} = \frac{\cos(\varphi + \alpha)}{\cos\varphi\cos\alpha} - 1 \tag{4}$$
$$= \frac{\cos\varphi\cos\alpha - \sin\varphi\sin\alpha}{\cos\varphi\cos\alpha} - 1 = -\tan\varphi\tan\alpha$$

If the angle φ is a 45°, tan φ is equal to 1 and δv is equal to –tan α. If the angle α of the skew flow is varied within the range of 1~10°, the measurement error δv of V⊥ is up to 1.745~17.63%. Generally, the skew flow angle α is a 2~3° in the river. Even through the ultrasonic transmitting time, the line L and the distance d are exactly measured, the measurement error δv of the flow velocity V⊥ is a 3.5~5.2%, which appears as a problem of the flow velocity measurement.

Third, a problem occurs in using the ultrasonic wave. The ultrasonic pulse is severely damped due to its abundant harmonic component. It is not only difficult to ensure the sufficient receipt strength, if the line L is relatively longer, but also may cause the larger measurement error of the transmitting time.

As shown in FIGS. 4A, 4B and 4C, ultrasonic pulses of two types are varied during being transmitted. Generally, the impact pulse is very often used (FIG. 4B). The ultrasonic pulse is absorbed or dissipated in a larger amount according to the concentration change of floating particles or the flow velocity of the gyration component. It causes the amplitude of the receiving signal to be severely pulsated. For it, when the receiving time point of the ultrasonic pulse is captured, the measurement error of the ultrasonic transmitting time occurs corresponding to one or two period of the ultrasonic frequency. In order to reduce the measurement error of the ultrasonic transmitting time, it is not possible to auxiliary increase the frequency of the ultrasonic pulse in the river. The higher the frequency is, the larger the absorption damping occurs. Furthermore, the dissipation becomes larger due to the floating particles. Thus, it is preferable to lower the frequency, but as the frequency gets lowered, the intensity of the ultrasonic pulse is decreased to cause the cavitation phenomena. It means that it is not possible to transmit the ultrasonic pulse at over a certain intensity in the river. As a result, the river width capable of being adapted to the transmitting time difference method is very limited.

Because of these three big problems, the prior art makes it difficult to measure the flowrate of the river having a larger width. Nevertheless, if the prior art is used in measuring the flowrate of the river having a considerable width, it may increase the larger measurement error. Therefore, a method of measuring the flowrate by the ultrasonic wave is not utilized in the river except for an artificial open channel having a smaller width.

Accordingly, in order to resolve these problems and disadvantages, an object of the invention is to provide a method of measuring an ultrasonic horizontal average flow velocity to calculate the flowrate of a river having a larger width.

The other object of the invention is to provide a method of correcting and testing a flow velocity measuring apparatus for measuring the ultrasonic horizontal average flow velocity.

SUMMARY OF THE INVENTION

Accordingly, the invention is related to a method of measuring a drift distance that an ultrasonic beam is drifted in proportion to a flow velocity upon being transmitted at a right angle to a water flowing direction.

As shown in FIG. 5, an ultrasonic beam is transmitted in fluid from a non-floating point O toward a non-floating point a. If the fluid stands still (V=0), the ultrasonic beam reaches the point a. But, if the fluid runs, the ultrasonic wave reaches the point b. The distance (drift distance) l between the points a and b is represented as follows:

$$l = Vt = V\frac{D}{C} \tag{5}$$

Wherein, D is a width of a river, C is a transmitting velocity of an ultrasonic beam in fluid and t is a transmitting time of the ultrasonic beam through the width or interval distance D to be transmitted.

Angle θ that lines oa and ob form is represented as follows:

$$\tan\theta = \frac{l}{D} = \frac{V}{C}; \tag{6}$$

$$\theta = \tan^{-1}\left(\frac{V}{C}\right)$$

If ultrasonic emitting and receiving transducers are moved at the same speed as that of an average flow velocity, the angle θ becomes zero and also the distance l becomes zero. The angle θ and distance l each is called "an ultrasonic drift angle" and "an ultrasonic drift distance" as described below. The flow velocity V derived from expressions 5 and 6 is represented as follows:

$$V = \frac{l}{t} = \frac{lc}{D} \quad (7)$$

$$V = C\tan\theta \quad (8)$$

Therefore, the flow velocity V is obtainable by measuring the ultrasonic drift angle θ or distance l and the sound velocity C. The ultrasonic drift phenomena is a general physical science, its detailed explanation being omitted.

On the other hand, if it is intended to deduct an ultrasonic transmitting time difference flow velocity measurement expression, the sound velocity C would be mistaken for being changed according to the flow velocity, because the ultrasonic transmitting time is represented as $L/(C+V\cos\phi)$. The sound velocity C is changed only by the fluid property, but not influenced by the flow velocity. The transmitting time difference flow measurement expression is deducted from the ultrasonic drift (deflection). In other words, it should be not understood that the ultrasonic drift angle θ is the change of an ultrasonic transmitting direction. The transmitting direction is not influenced, but transmitted according to the flow velocity.

If the drift distance l or angle θ, the sound velocity C and the transmitting time t in the expressions (7) and (8) are exactly measured, the flow velocity V can be measured. It resolves three problems of the prior art in measuring the average flow velocity to calculate the flowrate in the river, because the ultrasonic beam is transmitted along the selected crosssection line of the water flow. It removes the obscureness related to the selection of the crosssection S. There is also no problem in amplifying a receiving signal by using continuous sine waves instead of an ultrasonic pulse, even through an amplitude of the receiving signal is severely pulsated. It resolves skew flow related problems, because a distance l or an angle θ is changed based on a component at a right angle to the ultrasonic transmitting direction, even through an angle α forming the crosssection S to the direction of the skew flow velocity becomes larger. If the flow velocity is corresponded to the ultrasonic transmitting direction, both of the distance l and angle θ become zero.

If the direction of the flow velocity forms an angle of 90°±α to the ultrasonic transmitting direction, the distance l is represented as follows:

$$l = \frac{V\cos\alpha}{C}D$$

$$\theta = \tan^{-1}\left(\frac{V\cos\alpha}{C}\right)$$

Wherein, $V\perp$ (=$V\cos\alpha$) is a flow velocity component at a right angle to an ultrasonic transmitting direction.

Therefore, if the ultrasonic transmitting direction is almost corresponded to the crosssection S selected to measure the flowrate, the flow velocity $V\perp$ is for the calculation of the flowrate. Only, it is not preferable to measure the drift angle θ and then obtain V (=$C\cdot\tan\theta$) by expression (8), because tan θ is equal to l/D. For example, it is desirable to obtain the flow velocity by the expression (7) without measuring the distance l and calculating the value of tan θ. Herein, it is noted that the ultrasonic drift distance l is exactly measured according to the invention.

BRIEF DESCRIPTION OF THE DRAWINGS

The invention will now be descried in detail with reference to the accompanying drawings, in which:

FIG. 1 is a view illustrating the principle of measuring the flowrate of an open channel according to a prior art;

FIGS. 6A and 6B are views illustrating a method of measuring an ultrasonic drift distance according to one embodiment of the invention;

DETAILED DESCRIPTION OF THE INVENTION

FIG. 6 shows a method of measuring an ultrasonic drift distance according to the invention. Ultrasonic receiving transducers $3_1$ and $3_2$ is constituted as an integrated pair of transducers spaced away in a certain interval L from each other. Ultrasonic emitting transducer 1 is connected to an ultrasonic oscillator 2. The ultrasonic emitting transducer 1 transmits continuous ultrasonic beams in water along a free flowrate measurement crosssection S. Referring to FIG. 6A, if the directional characteristics of ultrasonic beams from ultrasonic emitting transducer 1 are symmetrically formed, the directional angles are sufficiently small and the center point of paired ultrasonic receiving transducers $3_1$ and $3_2$(L/2 point) is corresponded to the line of the free crosssection S, when the flow velocity V is zero, paired ultrasonic receiving transducers $3_1$ and $3_2$ output voltage signals $U_{31}$ and $U_{32}$ equal to each other; for example, $U_{31}$ is equal to $U_{32}$. These outputting voltages are inputted into a differential amplifier 4 to amplify the voltage difference therebetween. At that time, the differential amplifier 4 outputs the signal voltage ΔU of zero; $\Delta U=K(U_{32}-U_{31}=0)$, wherein K is an amplification factor.

If the flow velocity V is not zero, the ultrasonic beam is drifted by a distance l; $l=(V/C)\cdot D$. The outputting voltage $U_{31}$ of the ultrasonic receiving transducer $3_1$ becomes smaller than that $U_{32}$ of the ultrasonic receiving transducer $3_2$; $\Delta U=K(U_{32}-U_{31})>0$. At that time, as paired ultrasonic receiving transducers $3_1$ and $3_2$ are moved along the direction at a right angle to the crosssection S for example, a X direction, ΔU is reduced to zero. As paired ultrasonic receiving transducers $3_1$ and $3_2$ are continuously moved, ΔU is converted into a negative value; $\Delta U<0$. Herein, it is noted that the point that the value of ΔU becomes zero represents as the ultrasonic drift interval l to be measured as shown in FIG. 6B.

Figure 2:
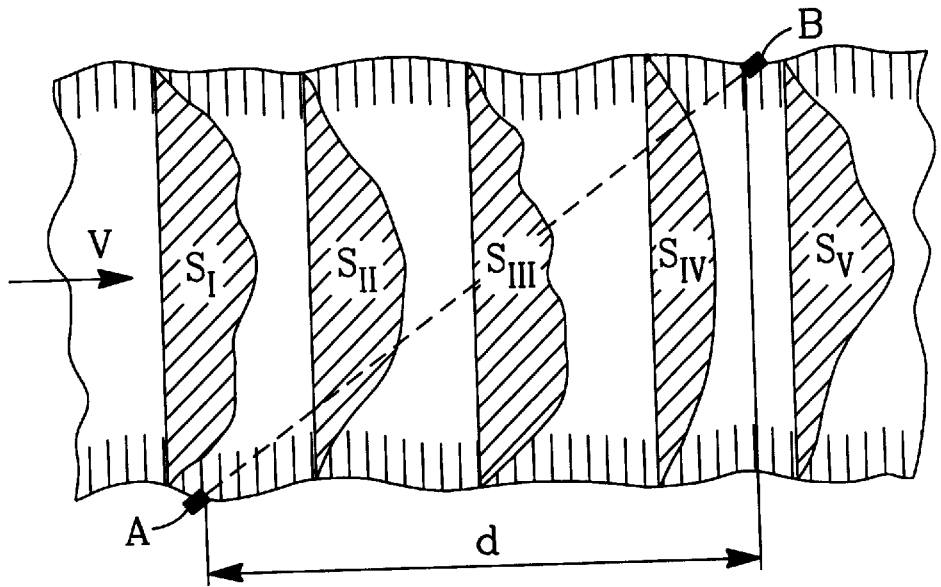
FIG. 2 is a view illustrating the crosssectional area change of an open channel such as a river.
Figure 3:
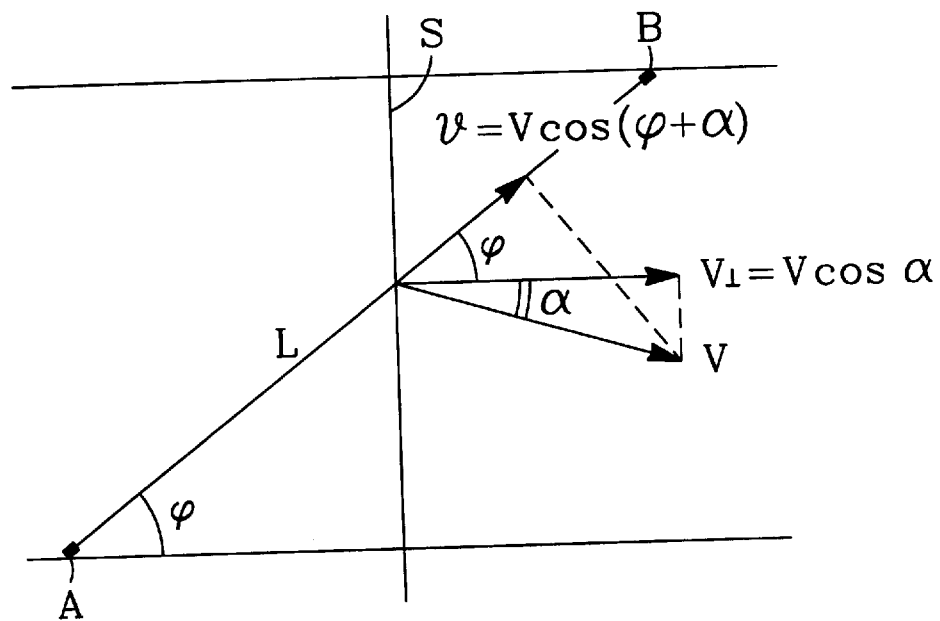
FIG. 3 is a view illustrating the measurement error of a flow velocity due to the skew flow.
Figure 4A:
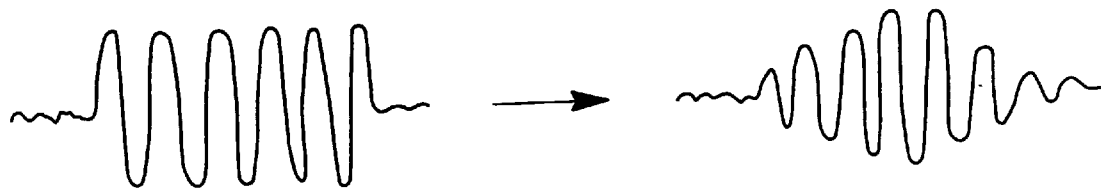
FIGS. 4A, 4B and 4C are views illustrating the damping of an ultrasonic pulse in fluid.
Figure 4B:
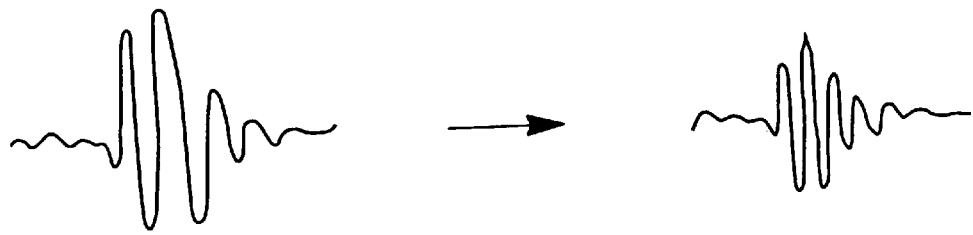
Figure 4C:
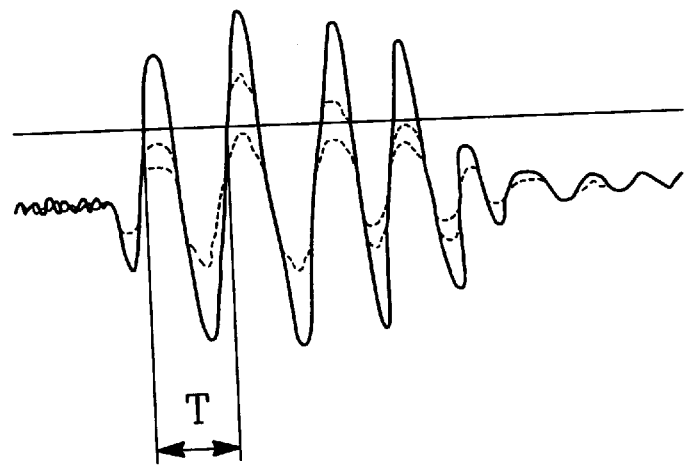
Figure 5:
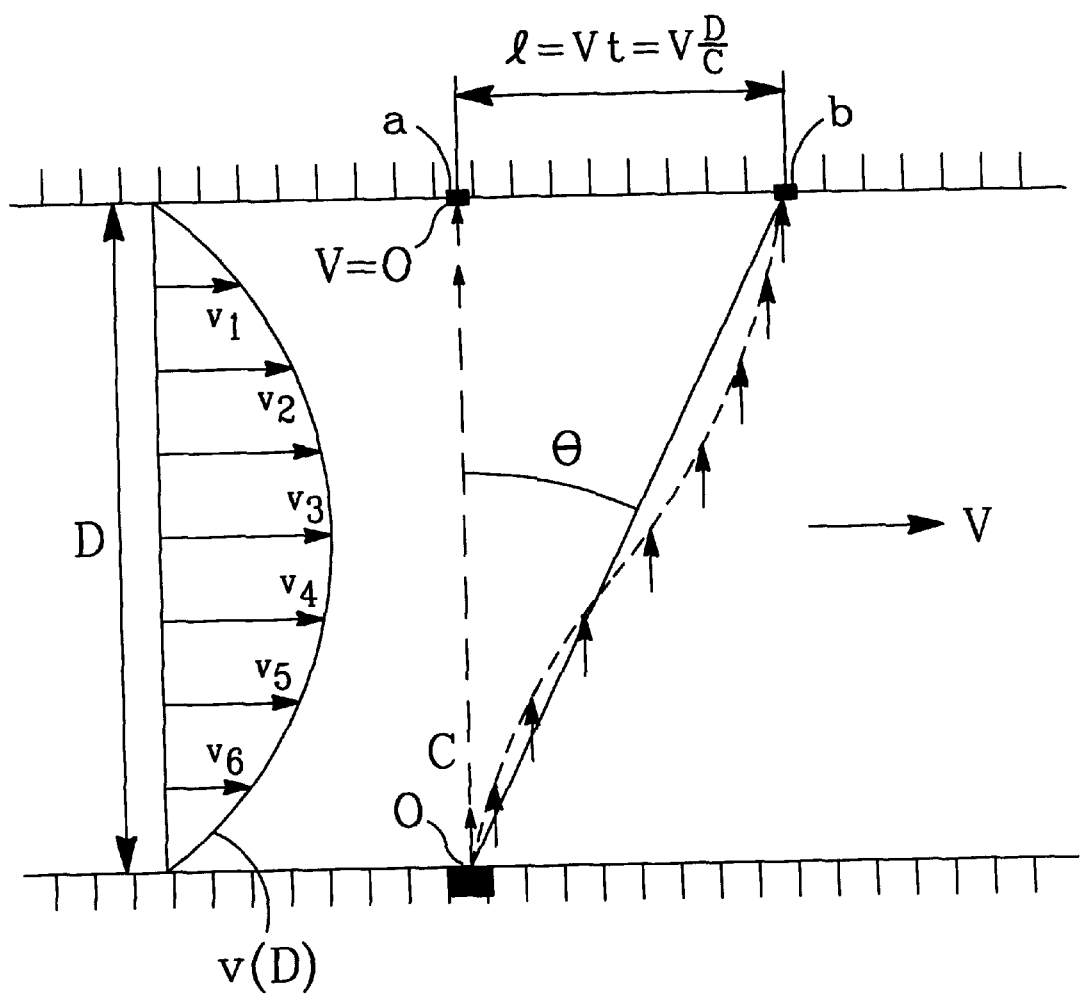
FIG. 5 is a view illustrating the transmitting drift of an ultrasonic beam based on the flow velocity.
Figure 7:
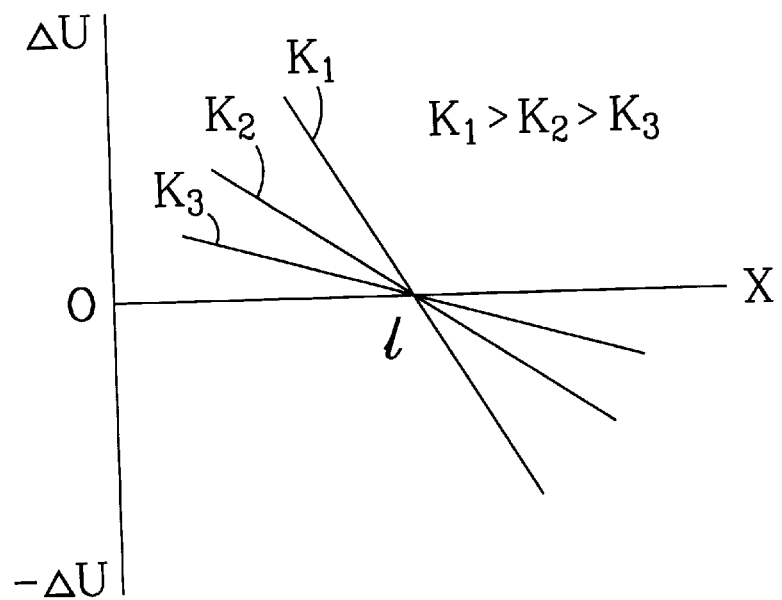
FIG. 7 is a graph illustrating the changing curves of signals received according to the invention.

FIG. 7 shows changing curves of the outputting ΔU of the differential amplifier 4; $\Delta U = K(U_{32} - U_{31})$. As the amplification factor K of the differential amplifier 4 becomes larger, the curve gradient of the voltage difference ΔU is increased. Therefore, it is simple to exactly catch the time point that ΔU becomes zero. For example, the outputting signal of the differential amplifier 4 is applied to a comparator (not shown), and then the outputting signal of the comparator operates a monostable multivibrator (not shown) to generate a given pulse signal. The given pulse signal enables the time point, when paired ultrasonic receiving transducers $3_1$ and $3_2$ pass through the position that ΔU becomes zero, to be captured.

Figure 8:
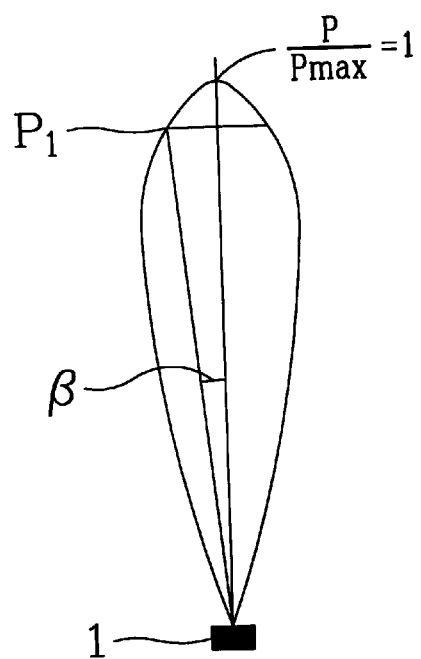
FIG. 8 is a view illustrating the selection of the distance interval between two receiving transducers according to the invention.

The distance interval L between paired ultrasonic receiving transducers $3_1$ and $3_2$ is selected as follows:

Referring to FIG. 8, an angle β formed between a point, that a sound pressure becomes maximum P/Pmax(=1,0) using the directional characteristic of the ultrasonic emitting transducer 1, and a point corresponding to a sound pressure $P_1$/Pmax, that the ultrasonic receiving transducers $3_1$ and $3_2$ are subject to receive, is obtained, and then the distance interval L is calculated by the following expression:

$$L = 2D \frac{P_1}{Pmax} \tan\beta \qquad (9)$$

For example, when the sound pressure $P_1$ is selected to have the value of 0.95 Pmax, assumed that the angle β is a value of 0.005°, L/D has a value of 0.000166 that is equal to 0 2·0.95·tan 0.05°. Therefore, when the widths of a river each is 100 m, 500 m and 1000 m, the values of the distance interval L are respectively 0.166 m, 0.83 m or 1.66 m. In order to reduce the distance interval L between paired ultrasonic receiving transducers $3_1$ and $3_2$, it is desirable that the directional angle of the ultrasonic beam emitted from the emitting transducer 1 becomes smaller. It is easy to secure the directional angle of 2°~3°. Also, when the sound pressure $P_1$/Pmax is selected to have a larger value, the directional angle β and the distance interval L become smaller. To it, the amplification factor K and intensity of the differential amplifier 4 should be increased.

The minimum and maximum moving distances Xmin and Xmax of paired ultrasonic receiving transducers $3_1$ and $3_2$ are represented as follows:

$$X_{\min} = 1{,}2\, l_{\min} = 1{,}2 \frac{V_{\min}}{C_{\max}} \cdot D$$

$$X_{\max} = 1{,}2\, l_{\max} = 1{,}2 \frac{V_{\max}}{C_{\min}} \cdot D$$

Therefore, the width ΔX between the moving distances is represented as follows:

$$\Delta X = X_{\max} - X_{\min} = 1{,}2 \cdot D \left( \frac{V_{\max}}{C_{\min}} - \frac{V_{\min}}{C_{\max}} \right) \qquad (10)$$

Wherein, Vmax and Vmin are maximum and minimum flow velocities in a river that are intended to measure an average flow velocity, Cmax and Cmin are maximum and minimum ultrasonic transmitting velocities in a river, D is a width of a river and 1,2 is a coefficient for moving paired ultrasonic receiving transducers $3_1$ and $3_2$ furthermore to exactly capture the time point that ΔU becomes zero, after x is equal to 1.

Giving an example of calculating a width ΔX, a moving distance of paired ultrasonic receiving transducers $3_1$ and $3_2$, if Vmin is 0.5 m/s, Vmax is 3 m/s, Cmax is 1500 m/s, in case that the water temperature of the river is about 26° C., and Cmin is 1423 m/s, in case that the water temperature of the river is about 0° C., ΔX/D is calculated as follows:

$$\frac{\Delta X}{D} \approx 0.00178$$

If the widths of the river D each is 100 m and 500 m, ΔX becomes 0.178 m and 0.89 m, respectively.

Figure 9A:
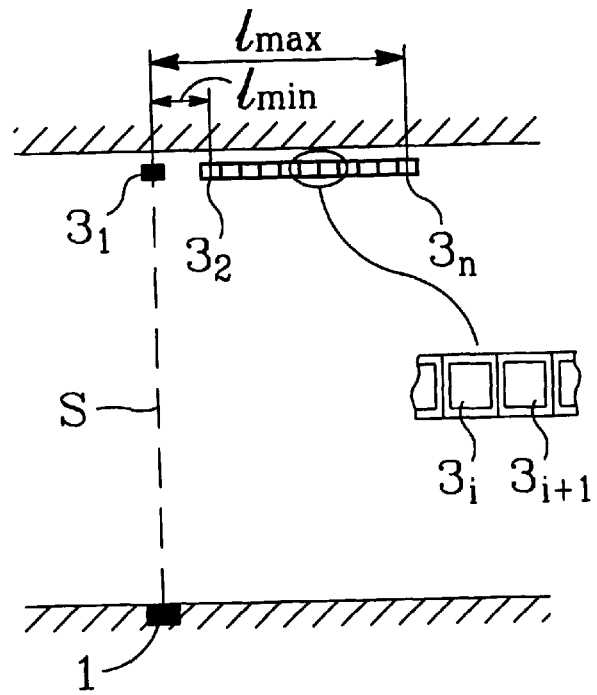
FIGS. 9A and 9B are views illustrating the selection of the distance interval between two receiving transducers according to the invention.
Figure 9B:
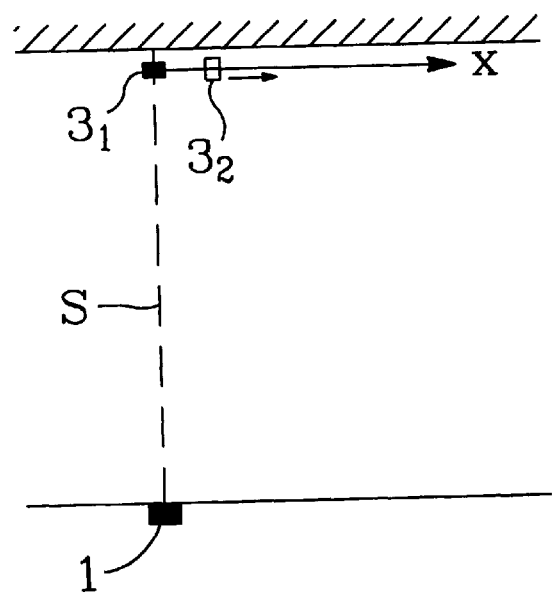

In order to explain the advantages in measuring an ultrasonic drift distance l according to the invention, another method of measuring the distance l is illustrated in FIGS. 9A and 9B.

Referring to FIG. 9A, a number of receiving transducers are arranged in the interval between the distances lmin and lmax in the form of a predetermined mosaic structure, which are electrically connected in turn to one end a of a number of differential amplifiers. The differential amplifiers are connected at their other ends to an ultrasonic receiving transducers $3_1$. Then, if the maximum sound pressure of the ultrasonic beam is applied to the receiving transducer 3i, the outputting voltage difference between ultrasonic receiving transducers $3_1$ and $3_i$ is maximized due to the flow velocity. If the interval between the distances lmin and lmax is divided into 100 and the voltage difference between the voltages Vmin and Vmax is measured by a device such as a potentiometer having one-hundredth resolution, it needs a module constituted as 100 ultrasonic receiving transducers in a mosaic form. If the voltage difference ΔV is 2.5 m/s; Vmax−Vmin=3−0.5=2.5, the flow velocity is measured by the resolution of 0.025 m/s(=2.5/100). In that case, the minimum flow velocity measurement error is represented as follows:

$$\delta v_{\min} = \frac{0.025 \times 100}{0.5} = 5\%$$

The measurement error is a relatively larger value.

The method should follow a mosaic module including hundreds of receiving transducers in the interval between the distances lmin and lmax in order to exactly measure the distance interval l. Thus, the receiving transducer $3_i$ should become smaller in its size. The receiving voltage also may get lowered below a noise level. An apparatus for realizing the method gets complex.

Referring to FIG. 9B, another method for measuring the distance l is illustrated. The method is to catch the position that the outputting voltage difference ΔU between paired ultrasonic receiving transducers $3_1$ and $3_2$ is maximized under the condition that a receiving transducer $3_1$ is fixed on a given place and a receiving transducer $3_2$ is being moved.

Herein, it is known that these methods is for measuring the distance l by capturing the position indexed at the maximum voltage difference ΔU between paired ultrasonic receiving transducers.

Figure 10A:
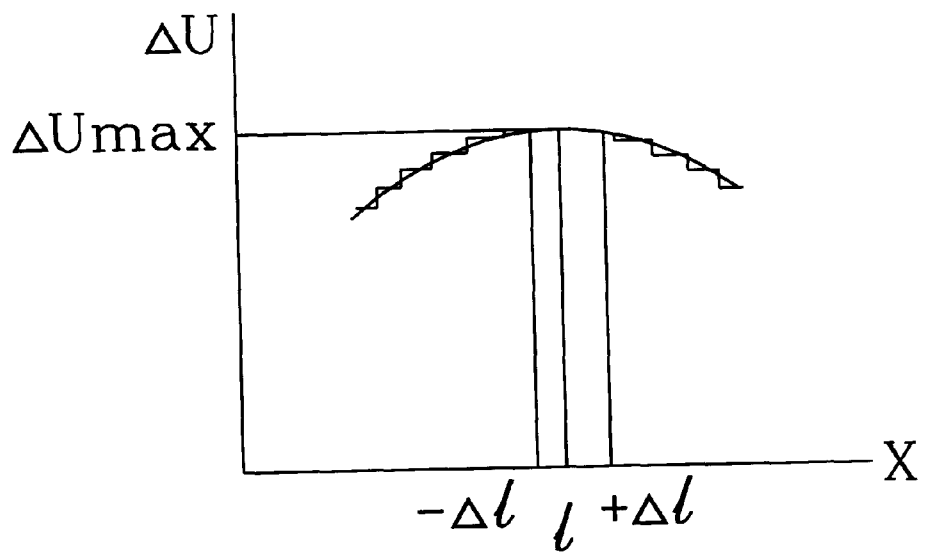
FIG. 10 is a graph illustrating a method of measuring the ultrasonic drift distance according to another embodiment of the invention.

Referring to FIG. 10A, a stepped curve shows outputting signal voltages from a plurality of ultrasonic receiving transducers in form of a mosaic structure. The curve might cause the larger error in capturing the time point that the voltage difference ΔU maximized due to the implicitness of its top point. The changing curve of the voltage difference ΔU is the same to the directional characteristic of the emitting transducer.

If the minimum flow velocity is 0.5 m/s, the width D of the river is 100 m and the sound velocity, the distance l is 33.3 mm. If the distance l is intended to be measured within the range of the error of 1%, the allowance error distance $\pm \Delta l$ is 0.33 mm.

Figure 10B:
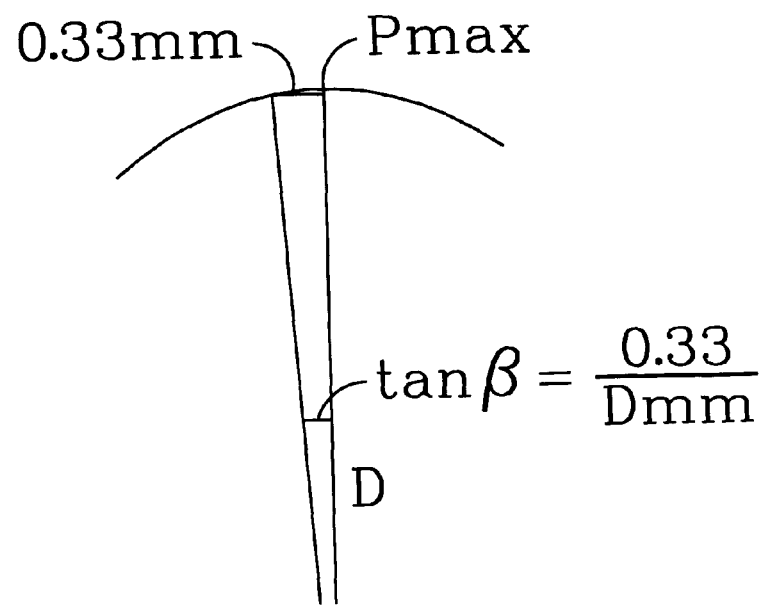

Referring to FIG. 10B, a point (a) spaced away in an allowance error distance $\Delta l$ of 0.33 mm from the position where the maximum pressure Pmax is at maximum based on the ultrasonic transmitting directional characteristics forms an angle β relative to the ultrasonic emitting position; for example, β is equal to tan (0.33 m/D). If a river width D is 100 m, the angle β is 0.00019°. Therefore, even through the directional angle of the ultrasonic emitting transducer 1 is secured as a relatively sharper cute one of 2°~3°, it is not possible to catch the position representing the maximum sound pressure.

Only, if the receiving transducer $3_2$ (shown in FIG. 9B) is forced to be moved at a rapid velocity, the curve changing ratio of the voltage difference function $\Delta U(t)$ is greatly increased, so that it may be integrated. At that time, a maximum value of the sound pressure Pmax could be somewhat caught, but an apparatus of moving the receiving transducer $3_2$ would be complicated.

As described above, when the voltage difference change outputted from the receiving transducers $3_1$ and $3_2$ is not integrated and a mosaic type of the receiving transducer is used, if the damping factor is pulsated during the transmitting of the ultrasonic beam, it is not possible to capture the moment that the sound pressure is maximized. In that case, while the outputting voltage ratios of the receiving transducers are measured, the time point that the measured voltage ratio is maximized should be captured, but a larger error in capturing the moment that the changing ratio is maximized occurs, because the outputting voltage changing ratio range is very little.

On the contrary, according to the invention, even through the intensity of the ultrasonic beam is fluctuated at the receiving position, there are no problems in capturing the moment that the voltage difference $\Delta U$ becomes zero. Also, the moving velocity of the receiving transducers $3_1$ and $3_2$ is irrelevant. Adjusting the interval L between the receiving transducers $3_1$ and $3_2$ can secure the larger voltage difference to be applied to differential amplifiers. Furthermore, an apparatus for capturing the moment that the voltage difference $\Delta U$ becomes zero is very simple. Therefore, the invention can measure the ultrasonic drift interval l, exactly.

In order to measure the ultrasonic drift interval l and then compute a horizontal average flow velocity V, the width D of a river and an ultrasonic transmitting time t or an sound velocity C in a river should be measured as follows:

$$V = \frac{l}{t} = \frac{lC}{D}$$

Herein, methods for measuring the ultrasonic transmitting time t and the sound velocity C are well-known, their detailed explanation being omitted because of being not included in the technical idea of the invention. Then, it should require a signal representing the operation of an ultrasonic transducer 1 at the ultrasonic emitting time in order to measure the ultrasonic transmitting time t. In other words, one side of the ultrasonic emitting transducer 1 should transmits the ultrasonic emitting signal to the other side of the ultrasonic receiving transducer in the river. Wire or wireless communication device is usable as a transmitting means.

Also, there is a well-known method for measuring the sound velocity C instead of the ultrasonic transmitting time t. For example, two receiving transducers are arranged toward the ultrasonic transmitting direction to be spaced away in an interval d form each other. Next, the receiving transducers receive ultrasonic beams emitted from the emitting transducer in turn, the ultrasonic transmitting time t is measured and the sound velocity C is calculated; C is equal to d/t. The sound velocity C is a one in the interval d. And then, an sound velocity to be measured is an sound velocity $C_D$ in the interval D. Under the condition that C is not equal to $C_D$, the measurement error of $C_D$ is $\delta_C [=(C-C_D)/C_D]$.

Un the same condition, the sound velocity C is changed according to a water temperature.

$$C \cong 1557 - 0.0244(74 - T)^2$$
$$\cong 1557[1 - 1.57 \cdot 10^{-5}(74 - T)^2]$$

Wherein, T is an average temperature of water in the interval set to transmit the ultrasonic beam. Therefore, the measurement error of $C_D$ is as follows:

$$\delta_C = \frac{1.57 \cdot 10^{-5}[(74 - T_D)^2 - (74 - T_d)^2]}{1 - 1.57 \cdot 10^{-5}(74 - T_D)^2} \times 100\%$$

For example, if the average temperature $T_D$ in the interval D is 24° C. and the water temperature $T_d$ in the interval d near the skirt of the river is 25° C., the measurement error $\delta_C$ is 0.0162%. The temperature difference $\Delta T$ between the average temperature $T_D$ in the river width D and the temperature $T_d$ near the river skirt is changed according to seasons, but does not exceed over 2° C.

If the horizontal average flow velocity is measured at a plurality of water depths in order to measure the flowrate, the measurement of the water depth should be accompanied. A technology for measuring the water depth by using an ultrasonic beam is well-known. Under the condition of being able to measure the water depth, the sound velocity C can be exactly measured. Only, the measured sound velocity is an sound velocity $C_h$ at a plurality of water depths, which is not corresponded to an sound velocity $C_{Di}$ in a plurality of horizontal intervals. If the water depth is relatively deeper in summer, the horizontal average sound velocity $C_D$ on a water surface is somewhat larger than the one $C_h$ under water. On the contrary, the horizontal average ultrasonic transmitting velocity $C_D$ is somewhat less than the one $C_h$. Herein, it is noted that the flow velocity measurement error on the water surface becomes positive, and the flow velocity measurement error under water becomes negative. Therefore, an error affecting on the computing result of the flowrate is reduced.

Figure 11:
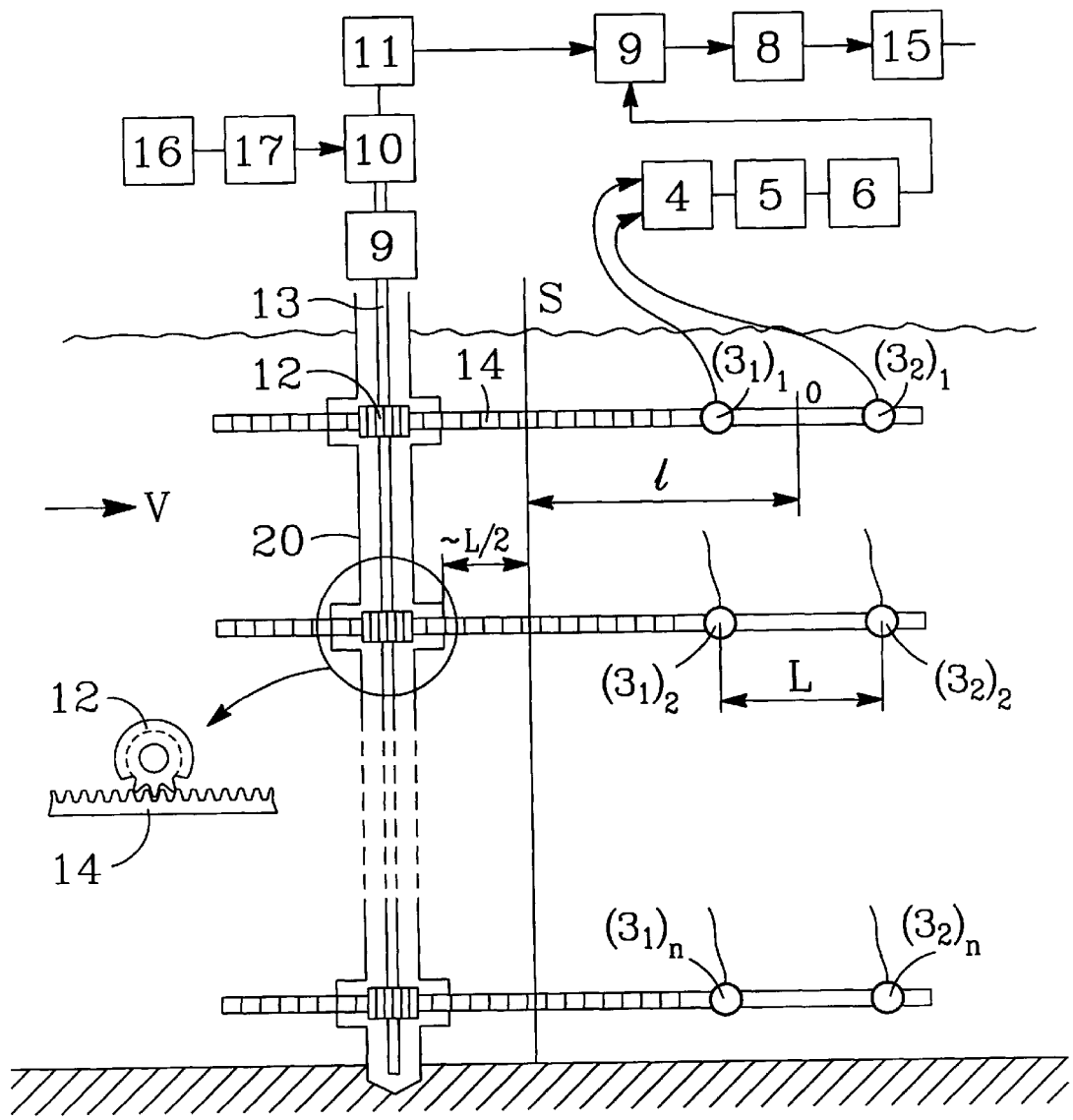
FIGS. 11 and 12 are views illustrating an apparatus constructed according to the embodiments of the invention; and, FIG. 13 is a view illustrating a method of correcting and testing the measurement error of the ultrasonic drift distance according to the invention.

An apparatus for realizing a method of measuring an ultrasonic drift interval l and computing a horizontal average flow velocity is as follows:

Referring to FIG. 11, the ultrasonic drift interval measuring apparatus for the horizontal average flow velocity is illustrated. A differential amplifier 4 receives outputting voltage signals from paired receiving transducers $(3_1)_i$ and $(3_2)_i$. A comparator 5 generates a pulse signal to operate a monostable multivibrator or one shot multivibrator 6, when the outputting voltage of the differential amplifier 4 becomes zero, paired receiving transducers $(3_1)_i$ and $(3_2)_i$ are mounted on a rack 14 to be spaced away in an interval L from each other. The rack 14 is forced to be moved leftward and rightward according to the rotational direction of a pinion 12. A shaft 13 of the pinion 12 is rotatably coupled to a transmission 9 for reducing the rotational number of an electrical motor. The electrical motor 10 is connected in turn to a counter 11 for detecting the rotation number thereof and a first timer 16 and a first power switch 17 to control the on-off operation thereof. A multiplexer 7 receives the pulse signal from the comparator 6 and the counting signal from the counter 11 to generate a data signal corresponding to the moving distance l of the rack 14. A first arithmetic-logical processing unit 8 memorizes a horizontal distance $D_i$(= const) previously inputted at a memory and receives the data signal from the multiplexer 7 and a data signal of an sound velocity C from a well-known sound velocity measuring apparatus (not shown) to compute the flow velocity V; V is equal to l·C/D. A second arithmetic-logical processing unit 15 receives the data signal from the arithmetic-logical processing unit 8 to compute the flowrate of a river. A cases includes the pinion and the rack mounted therein. The pinion and rack are made of a material such as polyurethane to be operated without using lubricant agents.

Figure 12:
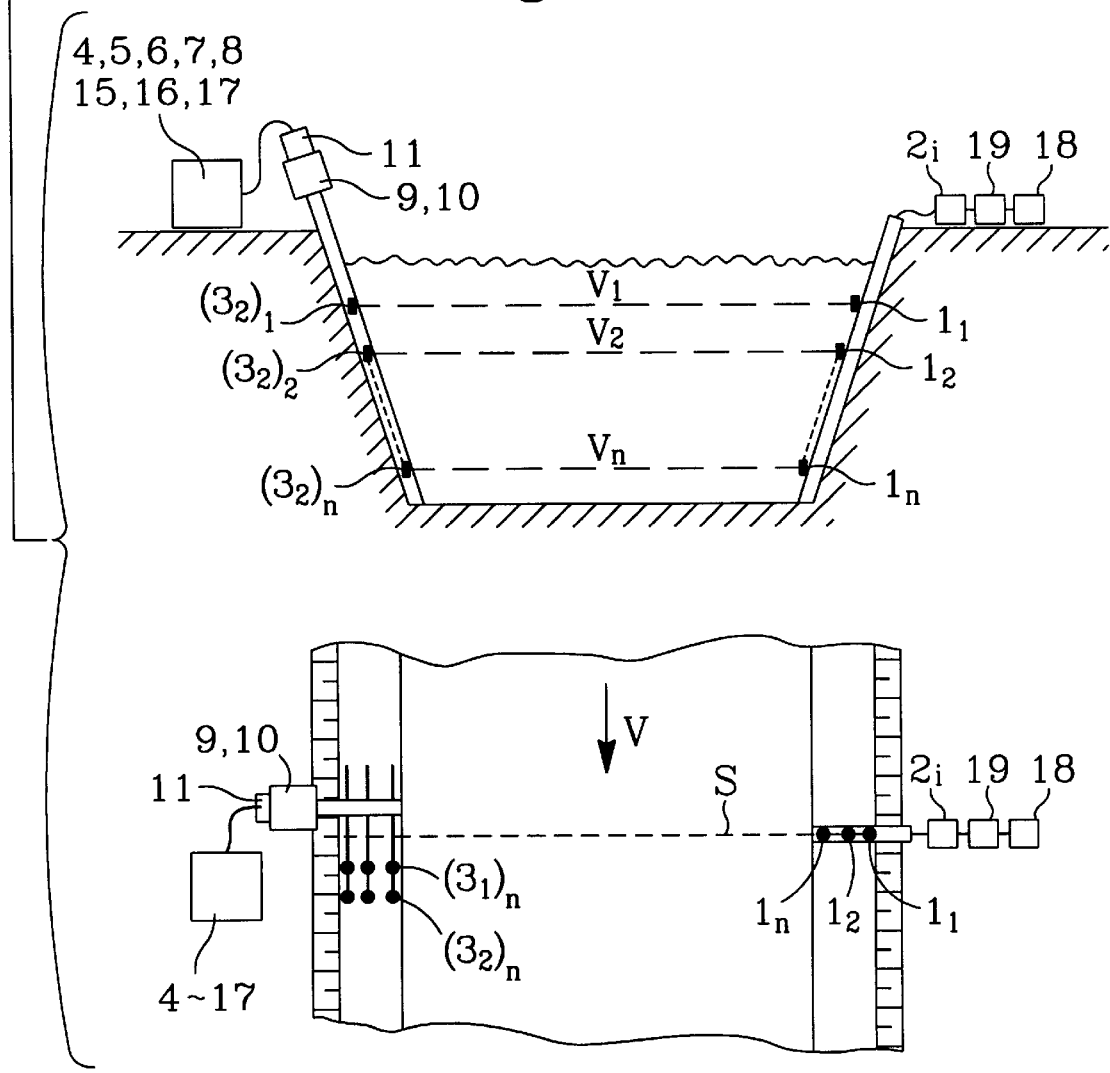

Referring to FIGS. 12A and 12B, ultrasonic emitting transducers $1i$ are electrically connected to an oscillator $2i$ for generating ultrasonic sine wave oscillating signals, in which the ultrasonic emitting transducers $1i$ are subject to be vibrated at an ultrasonic frequency different from one another in order to generate the ultrasonic beams at the same time; for example, $f_1 \neq f_2 \neq \ldots \neq f_n$. The oscillator $2i$ is connected in turn to a second timer 18 and a second power switch 19 to control the on-off operation thereof. In other words, the second timer 19 applies a signal to the second power switch 18 per a given flowrate measuring time for example, one hour. The first timer 16 mounted on the receiving side is synchronized with the second one 18 on the transmitting side.

On the other hand, as shown in FIG. 11, an apparatus including the pinion 12 and the rack 14 for moving paired receiving transducers $(3_1)_i$ and $(3_2)_i$ is positioned to be spaced away in one-half of the distance L against the flow velocity direction from a flowrate measuring crosssection S. Under the state that the flow velocity is not measured, the central point L/2 between paired receiving transducers $(3_1)_i$ and $(3_2)_i$ is corresponded to the flowrate measuring cross-section S.

The flow velocity measuring apparatus is operated as follows:

On the flowrate measuring, the first and second timers 16 and 18 are operated to turn on the power switches 17 and 19. At that time, the power switches 16 and 18 operate the emitting transducers $1i$ to emit an ultrasonic beam of continuous sine waves to paired receiving transducers $(3_1)_i$ and $(3_2)_i$. Whereby, the paired receiving transducers $(3_1)_i$ and $(3_2)_i$ receive the emitted continuous ultrasonic beam. At the same time, the electrical motor 10 is operated to rotate the pinions 12 as well as to move the racks 14 toward the flow velocity direction. Simultaneously, the paired receiving transducers $(3_1)_i$ and $(3_2)_i$ fixed to the racks 14 are moved in the same direction as that of the rack 14. During their moving, the outputting voltages of the paired receiving transducers $(3_1)_i$ and $(3_2)_i$ become equal to each other. When the outputting voltage $\Delta U$ becomes zero, the monostable multivibrator 6 generates a signal pulse to apply it to the multiplexer 7. On the other hand, as the electrical motor 10 is rotated, the counter 11 counts the rotation number of the electrical motor 10 to generate a signal pulse corresponding to the moving distance of the rack 14. When the multiplexer 7 receives the signal pulse from the monostable multivibrator 6, it applies the signal pulse to the first arithmetic-logical processing unit 8, in which the signal pulse is corresponding to the drift interval distance l according to the drift distance measuring method of the invention.

The first arithmetic-logical processing unit 8 memorizes the horizontal distance Di at a plurality of water depths previously set and receives data signals of the water depths and the sound velocity C from the sound velocity measuring apparatus (not shown). The first arithmetic-logical processing unit 8 computes the horizontal average flow velocity Vi to output the computed result to the second arithmetic-logical processing unit 15; Vi is equal to (li·C)/Di. On completing the measurement of the ultrasonic drift interval li at a plurality of water depths, the electrical motor 8 is stopped and then reversely rotated to return the paired receiving transducers $(3_1)_i$ and $(3_2)_i$ to the original position, in which a control portion of the electrical motor 8 is not illustrated in FIG. 11 and its explanation is omitted, because it is well-known in the field of a prior art.

The flow velocity distribution in a river is considered that the lowest velocity under water and the highest velocity on the water surface are formed. Thus, the interval distance l is equal to lmin at the lowest depth under water, so that a signal representing the time point that the voltage difference $\Delta U$ becomes zero is generated in the earliest time. As the interval distance l is gradually increased according to the lowering of the water depth, the position that the outputting signal voltages of the paired receiving transducers $(3_1)_i$ and $(3_2)_i$ arranged nearest the water surface are equal to each other corresponds to the maximum drift interval distance lmax, so that a signal representing the time point that the voltage difference $\Delta U$ becomes zero is generated in the latest final time.

A flowrate measuring time depends on the moving velocity of the rack 14. It is no doubt whether the apparatus may measure the drift interval distance l, exactly. In other words, the rotation speed of the electrical motor 10, the changing ratio of the transmission 9, the moving distance of the rack 14 per one rotation of the pinion 12, the rotation number of the electrical motor 10, the resolution of measuring the voltage difference etc. are properly selected to control the allowance error of measuring the drift interval distance l.

According to the invention, a method of measuring an ultrasonic drift interval distance and then a horizontal average flow velocity can be easily realized and measure the flowrate of a river, exactly, unlike prior arts.

Figure 13:
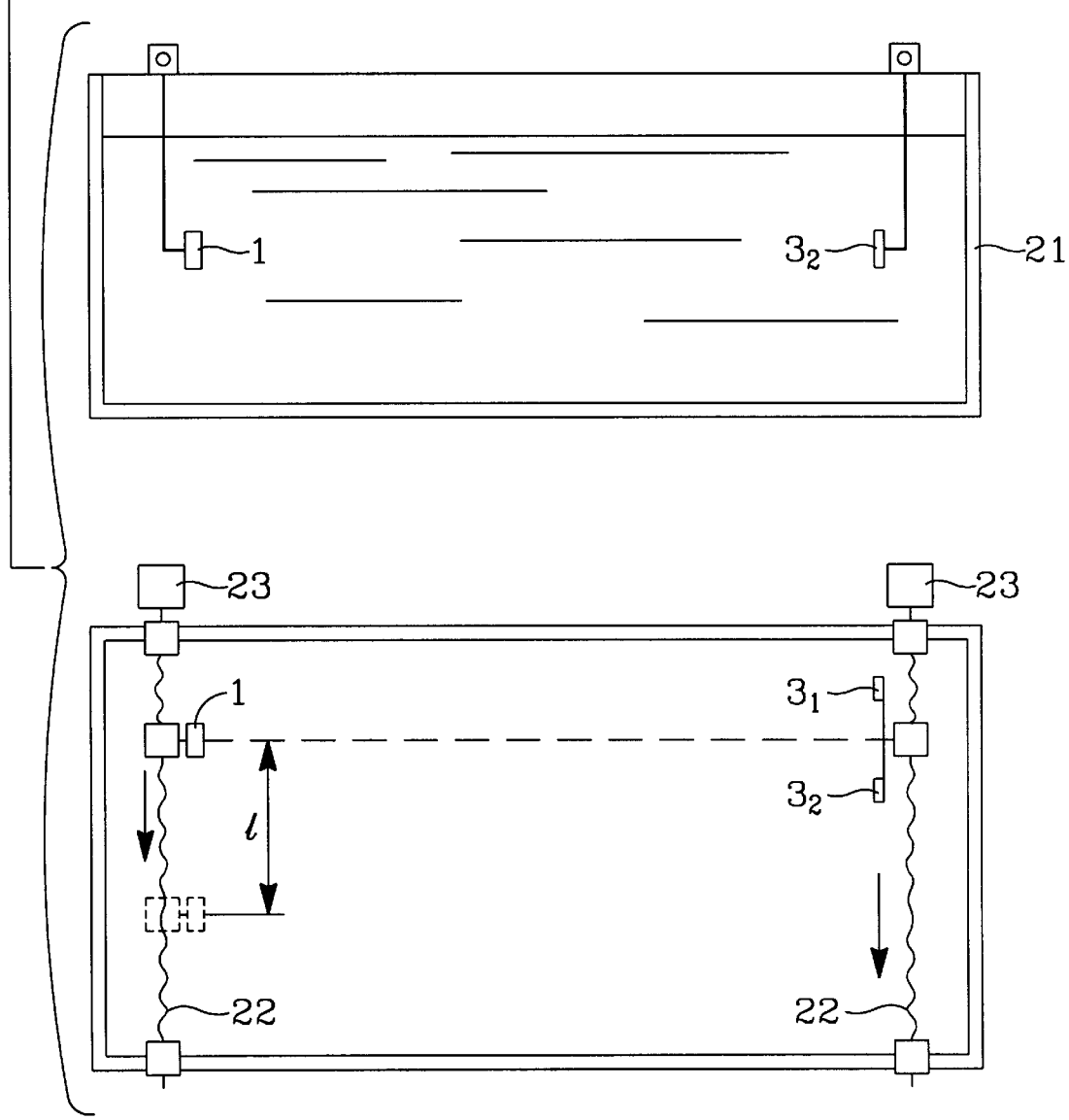

Furthermore, it is very important to correct and test an apparatus for measuring an ultrasonic drift interval distance and then a horizontal average flow velocity. A method of correcting and testing the apparatus is illustrated in FIG. 13.

A water tank 21 includes an emitting transducer 1 and paired receiving transducers $3_1$ and $3_2$ respectively and movably mounted on micrometer screw rods 22, in which the micrometer screw rods 22 are mounted on both end portion of the water tank 21. As the paired receiving transducers $3_1$ and $3_2$ are moved leftward and rightward, the position at a moment that a monostable multivibrator 6 generates a signal pulse is measured. If the ultrasonic directional characteristic of the emitting transducer 1 is symmetrical, a line formed at a right angle with respect to the interval distance D between the paired receiving transducers $3_1$ and $3_2$ from the emitting transducer 1 crosses the one-half point l/2 of the interval distance D. If the ultrasonic directional characteristic of the emitting transducer 1 is non-symmetrical, the line crosses another point between the paired receiving transducers $3_1$ and $3_2$, in which the crossing point is a point crossing a free crosssection S selected to measure the flowrate.

Next, the emitting transducer 1 is moved by the allowance error distance Δl of the ultrasonic drift interval 1 (for example, 0.25 mm), using the micrometer 23. As the paired receiving transducers $3_1$ and $3_2$ are moved to pass through the point corresponding to the allowance error distance Δl. At that time, it is determined whether the monostable multivibrator 6 generates the signal pulse at the point passing through the allowance error distance Δl. If the monostable multivibrator 6 does not generate the signal pulse, it is because the amplification factor K of the differential amplifier 4 is relatively smaller, or the ultrasonic directional angle of the emitting transducer 1 is relatively larger. Thus, when the amplification factor K of the differential amplifier 4 is subject to be increased, if the monostable multivibrator 6 does not generate the signal pulse, the interval distance D between the paired receiving transducers $3_1$ and $3_2$ is adjusted to force the monostable multivibrator 6 to generate the signal pulse at the point passing through the allowance error distance Δl. Then, the emitting transducer 1 is moved through intervals dividing the interval distance between the minimum and maximum interval distances lmin and lmax into several ones. Simultaneously, the paired receiving transducers $3_1$ and $3_2$ is moved. During these operating, it is determined whether the position at a moment that the monostable multivibrator 6 generates the signal pulse corresponds to the moving position of the emitting transducer 1. And then, the allowance error of the drift interval distance l is tested. The water tank 21 is enough available, if its length is 5 m.

Accordingly, the invention has a great advantage that the ultrasonic drift interval distance 1 is simply tested and corrected. In other words, the ultrasonic drift interval distance l is equal to the distance that the emitting transducer 1 is moved at the flow velocity V for a time t transmitting the ultrasonic beam in a river having the width D; t is equal to D/C. For it, after the emitting transducer 1 is moved to the interval distance l in the water tank, the test for correcting the allowance error of the drift interval distance l can be performed during the movement of the paired receiving transducers $3_1$ and $3_2$.

What is claimed is:

1. A method of measuring a horizontal average flow velocity at a plurality of depths using an ultrasonic beam to calculate a flowrate in a larger river comprising steps of:

selecting a flowrate measuring free crosssection S to be at a right angle to the flow direction of water;

mounting an ultrasonic emitting transducer at a given depth along one skirt of the river to emit ultrasonic beams toward the other skirt;

mounting paired ultrasonic receiving transducers on a line formed at a right angle to the free crosssection S to be spaced away in an interval distance L from each other at a plurality of depths along the other skirt of the river;

moving the paired ultrasonic receiving transducers at the same direction as that of the flow velocity by reference of the center point that the crosssection S is crossed;

catching the point that the outputting voltages of the paired ultrasonic receiving transducers are equal to each other;

measuring an ultrasonic drift interval distance l between the captured point and the center point; and, measuring a horizontal average flow velocity V as the following expressions:

$$V = \frac{l}{t}; \quad (11)$$

or $$V = \frac{lc}{D}; \quad (12)$$

wherein, t is an ultrasonic transmitting time passing through a distance D between the center point and the emitting transducer and C is an sound velocity in liquid at the time of measuring the flow velocity.

2. The method of measuring a horizontal average flow velocity as claimed in claim 1, wherein:

the interval distance L between the paired ultrasonic receiving transducers is calculated as follows:

$$L \geq 2D \frac{P_1}{P_{\max}} \tan\beta; \quad (13)$$

wherein, Pmax is a maximum sound pressure of the directional characteristic of the emitting transducer, $P_1$ is a sound pressure that the receiving transducers is intended to receive and β is an angle between lines connecting the center point to $P_1$ and Pmax.

3. The method of measuring a horizontal average flow velocity as claimed in claim 1, wherein:

the step of capturing the point that the outputting voltages of the paired ultrasonic receiving transducers are equal to each other comprises furthermore steps of applying the outputting voltages of the paired ultrasonic receiving transducers to differential amplifiers to amplify them, detecting the moment that the voltage difference ΔU between the differential amplifiers becomes zero and capturing the position that the outputting voltages of the paired ultrasonic receiving transducers are equal to each other.

4. The method of measuring a horizontal average flow velocity as claimed in claim 1, wherein:

the step of measuring the ultrasonic drift interval distance l comprises furthermore steps of mounting the emitting transducer and the paired receiving transducers spaced away in an interval L from each other in a water tank, moving the emitting transducer in parallel to the line L through intervals divided into some ones from the initial position and comparing the moving distance with the interval one measured by the paired receiving transducers to detect the moment that the voltage difference ΔU becomes zero or the distance L.

5. The method of measuring a horizontal average flow velocity as claimed in claim 3, wherein:

the step of measuring the ultrasonic drift interval distance l comprises furthermore steps of mounting the emitting transducer and the paired receiving transducers spaced away in an interval L from each other in a water tank, moving the emitting transducer in parallel to the line L through intervals divided into some ones from the initial position and comparing the moving distance with the interval one measured by the paired receiving transducers to detect the moment that the voltage difference ΔU becomes zero or the distance L.

* * * * *